(12) United States Patent
Zaier (10) Patent No.: US 7,904,203 B2
(45) Date of Patent: Mar. 8, 2011

(54) APPARATUS AND METHOD FOR ROBOT CONTROL

(75) Inventor: Riadh Zaier, Muscat (OM)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/656,941

(22) Filed: Feb. 19, 2010

(65) Prior Publication Data

US 2010/0222927 A1 Sep. 2, 2010

Related U.S. Application Data

(63) Continuation of application No. PCT/JP2007/066192, filed on Aug. 21, 2007.

(51) Int. Cl.
*G06F 19/00* (2011.01)
(52) U.S. Cl. ............... 700/245; 700/253; 700/254; 318/568.12
(58) Field of Classification Search .......... 700/245, 700/253, 254; 901/1, 46; 180/8.1, 8.5, 8.6; 318/567, 568.12, 568.22, 590, 591, 630, 318/632, 636, 646
See application file for complete search history.

(56) References Cited

U.S. PATENT DOCUMENTS

| | | | | |
|---|---|---|---|---|
| 5,221,883 A | * | 6/1993 | Takenaka et al. | 318/568.12 |
| 5,343,397 A | * | 8/1994 | Yoshino et al. | 701/23 |
| 5,838,130 A | * | 11/1998 | Ozawa | 318/568.2 |
| 6,064,167 A | * | 5/2000 | Takenaka et al. | 318/568.12 |
| 6,243,623 B1 | * | 6/2001 | Takenaka et al. | 700/245 |
| 6,289,265 B1 | * | 9/2001 | Takenaka et al. | 700/245 |
| 6,493,606 B2 | * | 12/2002 | Saijo et al. | 700/245 |
| 6,505,096 B2 | * | 1/2003 | Takenaka et al. | 700/245 |
| 6,556,892 B2 | * | 4/2003 | Kuroki et al. | 700/245 |

(Continued)

FOREIGN PATENT DOCUMENTS

JP 03-166076 7/1991

(Continued)

OTHER PUBLICATIONS

Zaier et al., Piecewise-linear pattern generator and reflex system for humanoid robots, Apr. 2007, IEEE, 1-4244-0602-1/07,pp. 2188-2195.*

(Continued)

*Primary Examiner*—Khoi Tran
*Assistant Examiner*—Jaime Figueroa
(74) *Attorney, Agent, or Firm*—Fujitsu Patent Center (57) ABSTRACT

A robot control apparatus for controlling walking of a robot includes a control information generating unit that generates control information based on a posture of a robot at a plurality of different points of time including at least a reference posture when the robot is independently standing without falling down, a feedback control unit that, with respect to the robot controlled according to the control information generated by the control information generating unit, performs a gyro feedback control based on a rotation angle measured at two points of time when rolling to left and right becomes maximum by a gyro sensor installed in the robot, and a rolling amplitude correcting unit that, while the robot is in motion, corrects a rolling amplitude that is used by the control information generating unit in generating the control information so that the gyro feedback control performed by the feedback control unit is reduced.

7 Claims, 10 Drawing Sheets

U.S. PATENT DOCUMENTS

| | | | |
|---|---|---|---|
| 6,628,286 B1* | 9/2003 | Comair et al. | 345/473 |
| 6,697,711 B2* | 2/2004 | Yokono et al. | 700/245 |
| 6,802,382 B2* | 10/2004 | Hattori et al. | 180/8.6 |
| 6,876,903 B2* | 4/2005 | Takenaka | 700/245 |
| 6,992,456 B2* | 1/2006 | Furuta et al. | 318/568.12 |
| 7,024,276 B2* | 4/2006 | Ito | 700/245 |
| 7,072,741 B2* | 7/2006 | Nagashima | 700/245 |
| 2005/0036649 A1* | 2/2005 | Yokono et al. | 382/100 |
| 2005/0113973 A1 | 5/2005 | Endo et al. | |
| 2005/0119791 A1* | 6/2005 | Nagashima | 700/253 |
| 2006/0195223 A1* | 8/2006 | Kawai et al. | 700/245 |
| 2007/0145930 A1 | 6/2007 | Zaier | |
| 2007/0150095 A1 | 6/2007 | Zaier | |

FOREIGN PATENT DOCUMENTS

| | | |
|---|---|---|
| JP | 2005-96068 | 4/2005 |
| JP | 2007-175809 | 7/2007 |
| JP | 2007-175810 | 7/2007 |

OTHER PUBLICATIONS

Faber et al., Stochastic optimization of bipedal walking using gyro feedback and phase resetting, 2007, IEEE, 978-1-4244-1862-6/07, pp. 203-209.*

International Search Report for PCT/JP2007/066192, mailed Oct. 2, 2007.

* cited by examiner

APPARATUS AND METHOD FOR ROBOT CONTROL

CROSS-REFERENCE TO RELATED APPLICATION(S)

This application is a continuation of International Application No. PCT/JP2007/066192, filed on Aug. 21, 2007, the entire contents of which are incorporated herein by reference.

FIELD

The embodiment discussed herein is directed to a robot control apparatus and a robot control method for controlling the walking of a robot.

BACKGROUND

In recent years, humanoid robots, particularly the walking of humanoid robots has been drawing attention of many researchers. The majority of researches regarding humanoid robot walking uses zero moment point (ZMP), and controls the ZMP to keep the ZMP inside the supporting polygon. In this approach, a humanoid robot and the surrounding environment of the robot are accurately modeled and differential equations are solved. However, the modeling becomes difficult if there is an unknown element. Moreover, since solving differential equation consumes time, it is difficult to perform real-time control.

Another approach does not use the ZMP. For example, one conventional technology makes use of a periodic motion of moveable parts of a robot and adjusts the phase of the periodic motion so that the posture of the robot remains stable (see Japanese Laid-open Patent Publication No. 2005-96068). Here, the movable parts indicate the legs and arms of a robot.

Moreover, development of other technologies are also underway. These technologies aim to efficiently control the robot so as to allow the humanoid robot to stably perform various motions, while eliminating the need of modeling a humanoid robot or the surrounding environment thereof.

The robot walking control includes feedback control based on the rotation angle of the robot. By reducing the fluctuation or overshooting of the ZMP attributed to the feedback control, it becomes possible to stabilize the walking of a robot. Therefore, reducing the feedback control as much as possible is a key to stable robot walking. Moreover, if the feedback control causes fluctuation or overshooting of the ZMP frequently, the motors used in the walking control get exhausted. Thus, reducing the feedback control as much as possible is also a key to reduction of the motor exhaustion.

SUMMARY

According to an aspect of an embodiment of the invention, a robot control apparatus for controlling walking of a robot includes a control information generating unit, a feedback control unit, and a rolling amplitude correcting unit. The control information generating unit generates control information based on a posture of a robot at a plurality of different points of time including at least a reference posture when the robot is independently standing without falling down. The feedback control unit, with respect to the robot controlled according to the control information generated by the control information generating unit, performs a gyro feedback control based on a rotation angle measured at two points of time when rolling to left and right becomes maximum by a gyro sensor installed in the robot. The rolling amplitude correcting unit, while the robot is in motion, corrects a rolling amplitude that is used by the control information generating unit in generating the control information so that the gyro feedback control performed by the feedback control unit is reduced.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings. In the present embodiment, the explanation is given with an emphasis on a case when the present invention is implemented to control a walking motion having no movement in the front-back direction, that is, a walking motion in which rolling, lifting, and landing are repeated without a stride. Moreover, although the following explanation is given for a two-legged humanoid robot as an example, the present invention can also be implemented to other types of robots such as a four-legged robot or the like.

Figure 1:
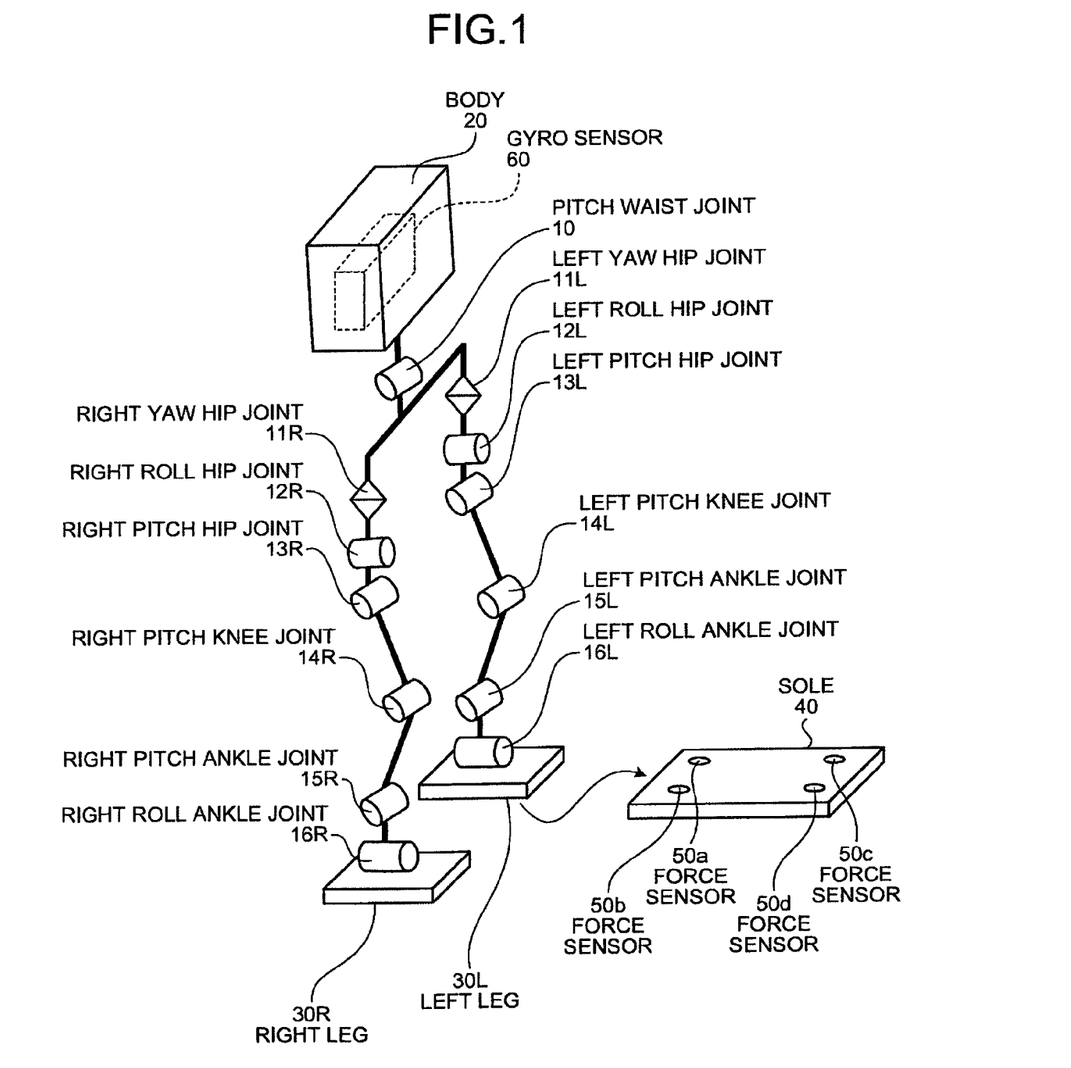
FIG. 1 is a schematic diagram of a robot according to a present embodiment.

Firstly, the explanation is given regarding a robot according to the present embodiment. FIG. 1 is a schematic diagram of the robot according to the present embodiment. As illustrated in FIG. 1, the robot includes a body 20; a gyro sensor 60 installed in the body 20; and two legs, namely, a right leg 30R and a left leg 30L, each of which has six joints. Thus, each leg has a degree of freedom equal to six. Meanwhile, the number of joints can be determined in an arbitrary manner.

The joints include a pitch waist joint 10, a right yaw hip joint 11R, a left yaw hip joint 11L, a right roll hip joint 12R, a left roll hip joint 12L, a right pitch hip joint 13R, a left pitch hip joint 13L, a right pitch knee joint 14R, a left pitch knee joint 14L, a right pitch ankle joint 15R, a left pitch ankle joint 15L, a right roll ankle joint 16R, and a left roll ankle joint 16L.

In each joint is embedded a motor (not illustrated in FIG. 1) that controls the motion of the corresponding joint.

The pitch waist joint 10 controls the front-back motion (pitching) of the body 20. The right yaw hip joint 11R and the left yaw hip joint 11L cause the left-right rotating motion (yawing) of the robot at the base portion of the respective legs.

The right roll hip joint 12R and the left roll hip joint 12L cause the sideways rotation (rolling) of the robot at the base portion of the respective legs. The right pitch hip joint 13R and the left pitch hip joint 13L cause the front-back motion (pitching) of the robot at the base portion of the respective legs.

The right pitch knee joint 14R and the left pitch knee joint 14L cause the front-back motion (pitching) of the robot at the respective knee portions. The right pitch ankle joint 15R and the left pitch ankle joint 15L cause the front-back motion (pitching) of the robot at the respective ankle portions. The right roll ankle joint 16R and the left roll ankle joint 16L cause the sideways rotation (rolling) of the robot at the respective ankle portions.

Meanwhile, to each leg is attached a sole 40. In FIG. 1, the sole 40 attached to the left leg 30L is illustrated. In each sole are embedded four force sensors. However, the number of force sensors can be determined in an arbitrary manner. In FIG. 1, force sensors 50a to 50d embedded in the sole 40 are illustrated. The force sensors 50a to 50d measure the reaction force to the sole 40 from the floor surface. The reaction force measured by the force sensors 50a to 50d is used in performing a compliance control and the feedback control of the motions made by the robot.

The gyro sensor 60 measures the rotation angles of the body 20 in the sideways (rolling) direction and the front-back (pitching) direction. The rotation angles measured by the gyro sensor 60 are used in performing the feedback control of the motions made by the robot.

Figure 2:
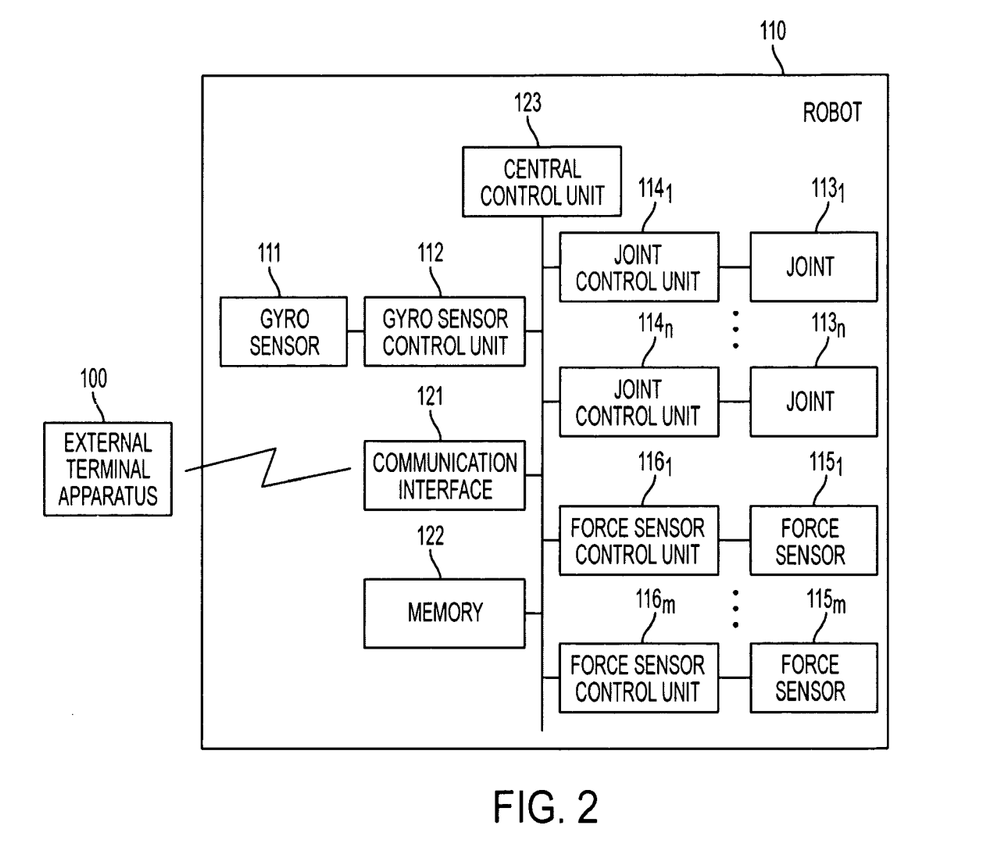
FIG. 2 is a functional block diagram of a configuration of a robot control system according to the present embodiment.

Given below is the description of a configuration of a robot control system according to the present embodiment. FIG. 2 is a functional block diagram of a configuration of the robot control system according to the present embodiment. As illustrated in FIG. 2, the robot control system includes an external terminal apparatus 100 and a robot 110.

The external terminal apparatus 100 is a personal computer or the like operated by an operator who administers the motions of the robot 110. The external terminal apparatus 100 performs communication, which includes reception and transmission of various types of information, with the robot 110.

The external terminal apparatus 100 sends to the robot 110 instruction information that is meant for the robot 110 and receives from the robot 110 information on the status (posture, velocity, or the like) of the robot 110. The information received from the robot 110 is displayed on a display device (not illustrated in the drawings).

The robot 110 is the two-legged humanoid robot illustrated in FIG. 1. The robot 110 includes a gyro sensor 111, a gyro sensor control unit 112, joints $113_1$ to $113_n$, joint control units $114_1$ to $114_n$ (n being a natural number), force sensors $115_1$ to $115_m$ (m being a natural number), force sensor control units $116_1$ to $116_m$, a communication interface 121, a memory 122, and a central control unit 123.

The gyro sensor 111 corresponds to the gyro sensor 60 illustrated in FIG. 1. The gyro sensor 111 is installed in the body 20 of the robot 110 and measures the rotation angles of the body 20 in the sideways (rolling) direction and the front-back (pitching) direction. The gyro sensor control unit 112 controls the functions of the gyro sensor 111 and sends to the central control unit 123 the information on the rotation angles obtained by the gyro sensor 111.

The joints $113_1$ to $113_n$ move various joints of the robot 110. For that, the joints $113_1$ to $113_n$ are driven by motors (not illustrated in the drawings). The joints include the pitch waist joint 10, the right yaw hip joint 11R, the left yaw hip joint 11L, the right roll hip joint 12R, the left roll hip joint 12L, the right pitch hip joint 13R, the left pitch hip joint 13L, the right pitch knee joint 14R, the left pitch knee joint 14L, the right pitch ankle joint 15R, the left pitch ankle joint 15L, the right roll ankle joint 16R, and the left roll ankle joint 16L.

The joint control units $114_1$ to $114_n$ control the motions of the joints $113_1$ to $113_n$, respectively. Particularly, the joint control units $114_1$ to $114_n$ perform control so that the joints $113_1$ to $113_n$ rotate for a predetermined time period at a predetermined angular velocity in a predetermined angle. The rotation angle, the angular velocity, and the time period are specified by the central control unit 123.

The force sensors $115_1$ to $115_m$ are installed in the soles of the right leg and the left leg of the robot 110. The force sensors $115_1$ to $115_m$ measure the reaction force experienced from the floor surface. Meanwhile, the force sensors $115_1$ to $115_m$ include the force sensors 50a to 50d illustrated in FIG. 1. The force sensor control units $116_1$ to $116_m$ control the functions of the force sensors $115_1$ to $115_m$, respectively, and send to the central control unit 123 information on the reaction force obtained by the force sensors $115_1$ to $115_m$.

The communication interface 121 performs communication, such as wireless communication and/or wire communication, with the external terminal apparatus 100.

The memory 122 stores therein a variety of information. For example, in the memory 122 is stored information received from the external terminal apparatus 100 and/or information sent to the external terminal apparatus 100. In addition, in the memory 122 is stored the result of various calculations performed by the central control unit 123.

The central control unit 123 controls the robot 110 as a whole. For example, based on walking instruction information received from the external terminal apparatus 100, the central control unit 123 calculates the start time of rotation, the angular velocity, the rotation angle, and the like of each of the joints $113_1$ to $113_n$ while the robot 110 is in motion and sends the calculation result to the joint control units $114_1$ to $114_n$.

The central control unit 123 also receives a motion control request for the robot 110 that is issued by the external terminal apparatus 100 via the communication interface 121. The motion control request includes a stride-length change request, a walking-direction change request, or a request for performing motions other than walking.

While executing a request, the central control unit 123 sends to the joint control units $114_1$ to $114_n$ the information on the start time of rotation, the angular velocity, the rotation angle, and the like of each of the joints $113_1$ to $113_n$ that corresponds to the requested motion.

Herein, the central control unit 123 is assumed to calculate various parameters such as the start time of rotation, the angular velocity, the rotation angle, and the like of each of the joints $113_1$ to $113_n$. Alternatively, it is also possible to implement a configuration in which the external terminal apparatus 100 calculates those parameters and accordingly controls the robot. When implementing such a configuration, the external terminal apparatus 100 receives the information necessary in calculating the start time of rotation, the angular velocity, the rotation angle, and the like from the robot 110 and then calculates the parameters based on the received information. Then, the joint control units $114_1$ to $114_n$ receive the information on the calculation result from the external terminal apparatus 100 and perform motion control of the robot 110 based on the received information.

Figure 3:
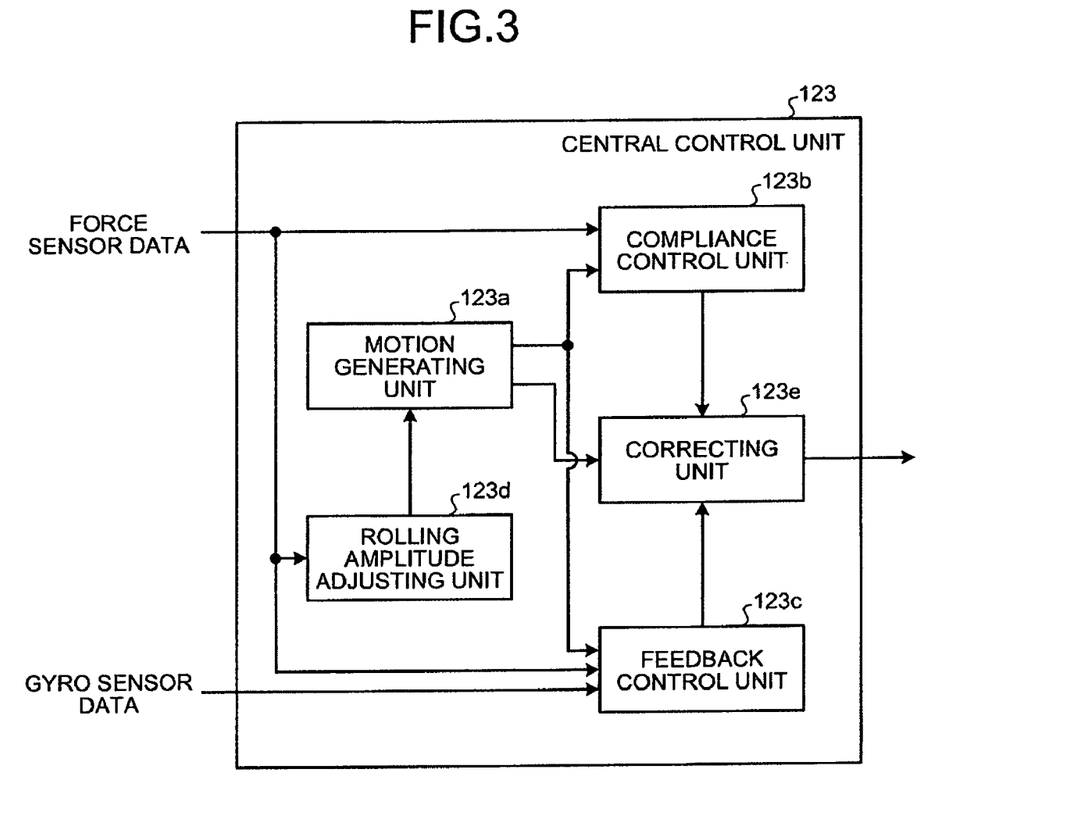
FIG. 3 is a functional block diagram of a configuration of a central control unit.

Given below is the detailed description of the robot control process performed by the central control unit 123. FIG. 3 is a functional block diagram of a configuration of the central control unit 123. As illustrated in FIG. 3, the central control unit 123 includes a motion generating unit 123a, a compliance control unit 123b, a feedback control unit 123c, a rolling amplitude adjusting unit 123d, and a correcting unit 123e.

The motion generating unit 123a is a processing unit that calculates, based on frame information received from the external terminal apparatus 100 via the communication interface 121, control information such as the start time of rotation, the angular velocity, the rotation angle, and the like of each of the joints $113_1$ to $113_n$ while the robot 110 is in motion and then outputs the control information to the correcting unit 123e. Herein, the frame information is the information on the posture of the robot 110 at a plurality of points of time including at least a reference posture when the robot 110 is independently standing without falling down.

Figure 4:
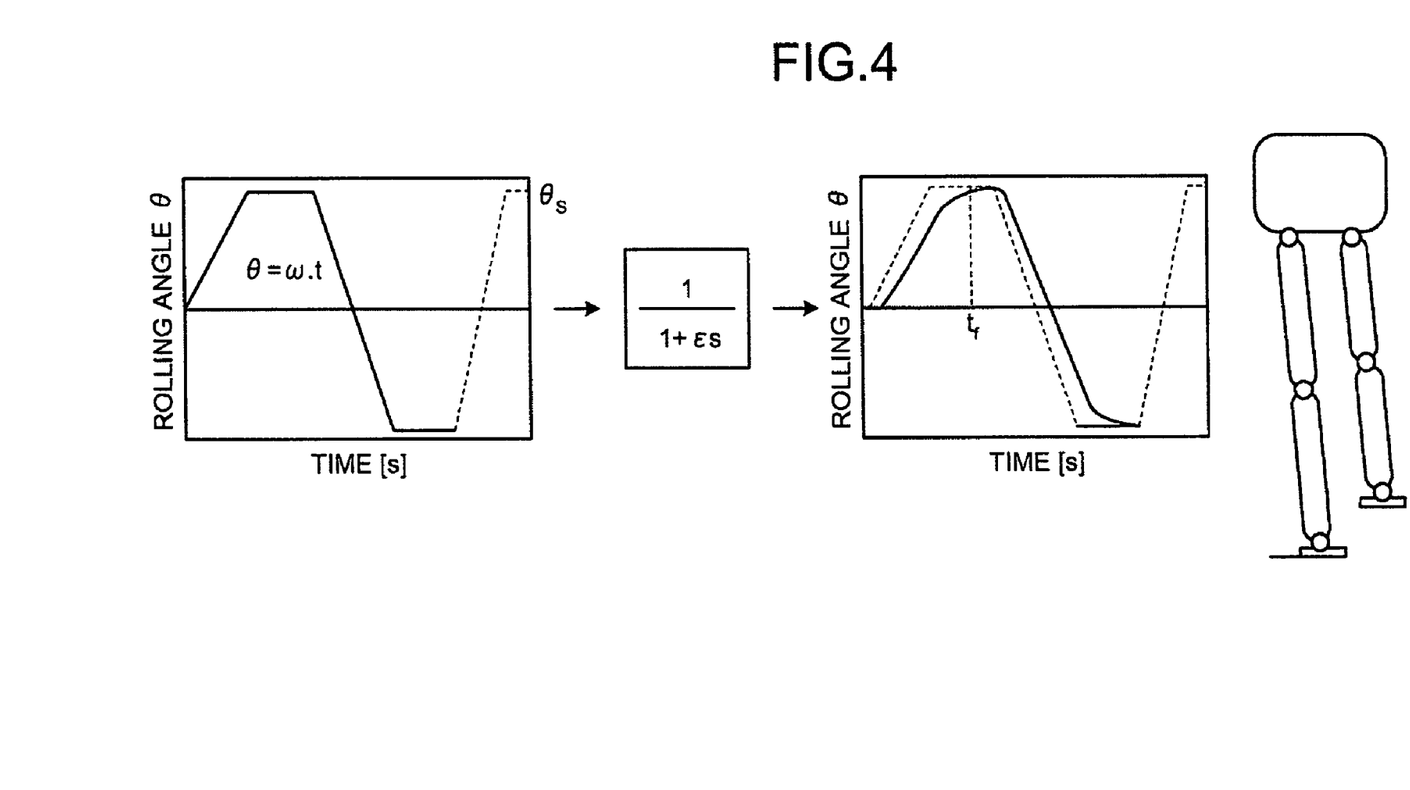
FIG. 4 is a schematic diagram for explaining a rotation angle calculated with respect to the rolling motion by a motion generating unit.

FIG. 4 is a schematic diagram for explaining a rotation angle calculated with respect to the rolling motion by the motion generating unit 123a. As illustrated in FIG. 4, the motion generating unit 123a calculates a piecewise-linear rotation angle. However, due to delay in the joints, the line representing the time change of the actual rolling angle has a smooth curve.

Besides, the motion generating unit 123a sends, to the compliance control unit 123b and to the feedback control unit 123c, phase information that indicates the phase from among a rolling phase, a lifting phase, and a landing phase in which the robot 110 is.

The compliance control unit 123b is a processing unit that, based on the force sensor data measured by the force sensors $115_1$ to $115_m$ and the phase information received from the motion generating unit 123a, performs the compliance control of the landing motion or the like. The compliance control unit 123b also calculates a compliance control amount and outputs it to the correcting unit 123e.

Figure 5:
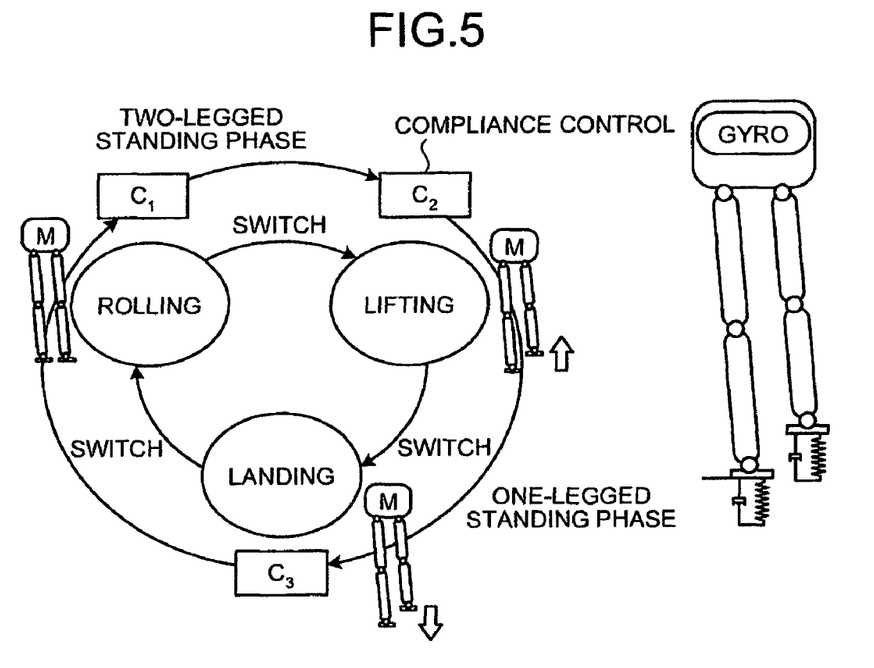
FIG. 5 is an explanatory diagram for explaining a compliance control performed by a compliance control unit.

FIG. 5 is an explanatory diagram for explaining the compliance control performed by the compliance control unit 123b. As illustrated in FIG. 5, the compliance control unit 123b performs the compliance control based on the phase from among the rolling phase, the lifting phase, and the landing phase in which the robot 110 is.

Figure 6:
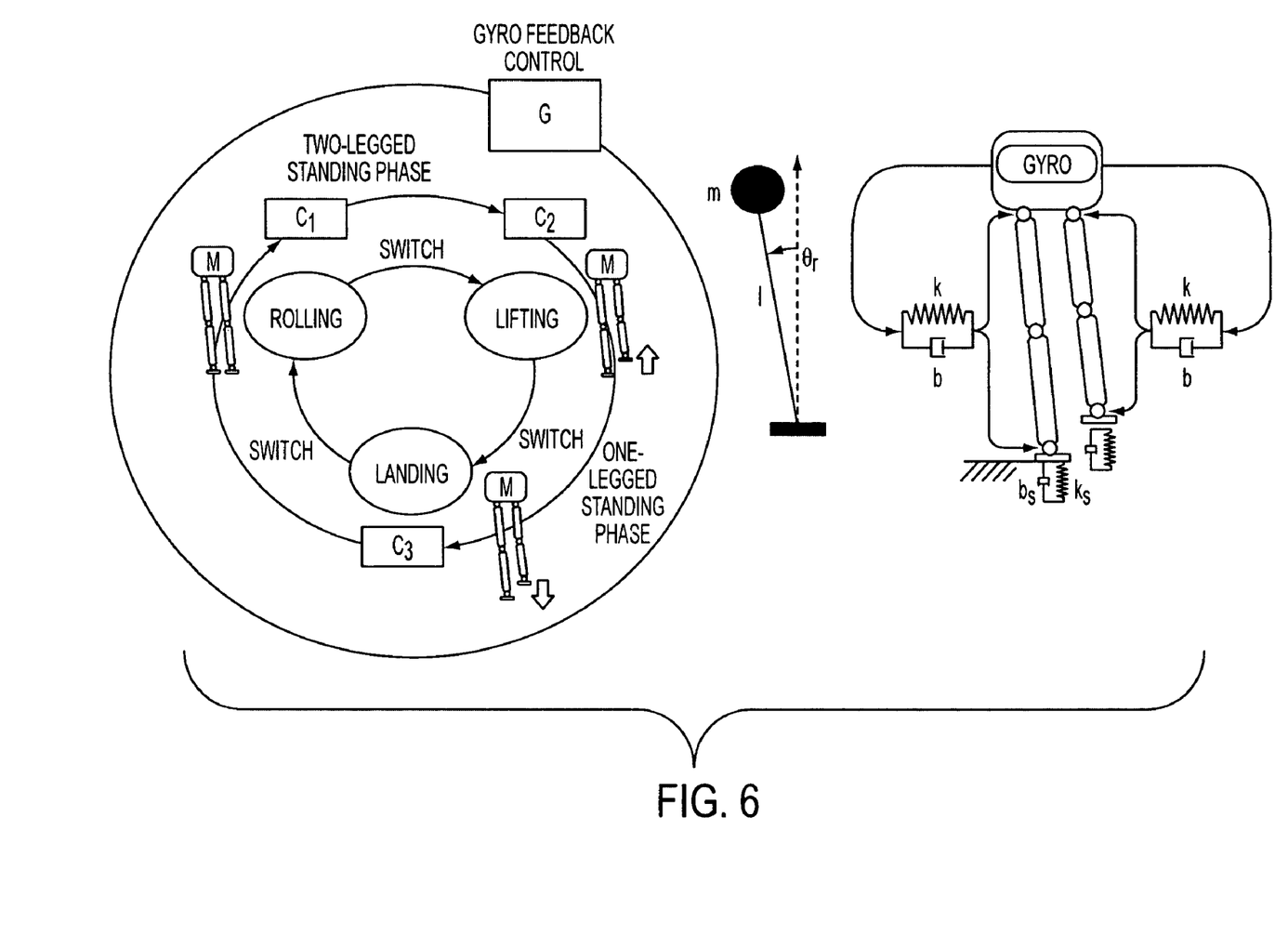
FIG. 6 is an explanatory diagram for explaining a gyro feedback control performed by a feedback control unit.

The feedback control unit 123c is a processing unit that performs a gyro feedback control (see FIG. 6) based on gyro sensor data measured by the gyro sensor 111 and performs a ZMP feedback control based on the force sensor data measured by the force sensors $115_1$ to $115_m$. The feedback control unit 123c also calculates a feedback control amount and outputs it to the correcting unit 123e. Meanwhile, the feedback control unit 123c performs the gyro feedback control at only two points of time when the rolling to left and right becomes the maximum.

The rolling amplitude adjusting unit 123d is a processing unit that adjusts rolling amplitudes, which are used as parameters by the motion generating unit 123a at the time of generating the control information for the rolling motion, so that the gyro feedback control is reduced.

Figure 7:
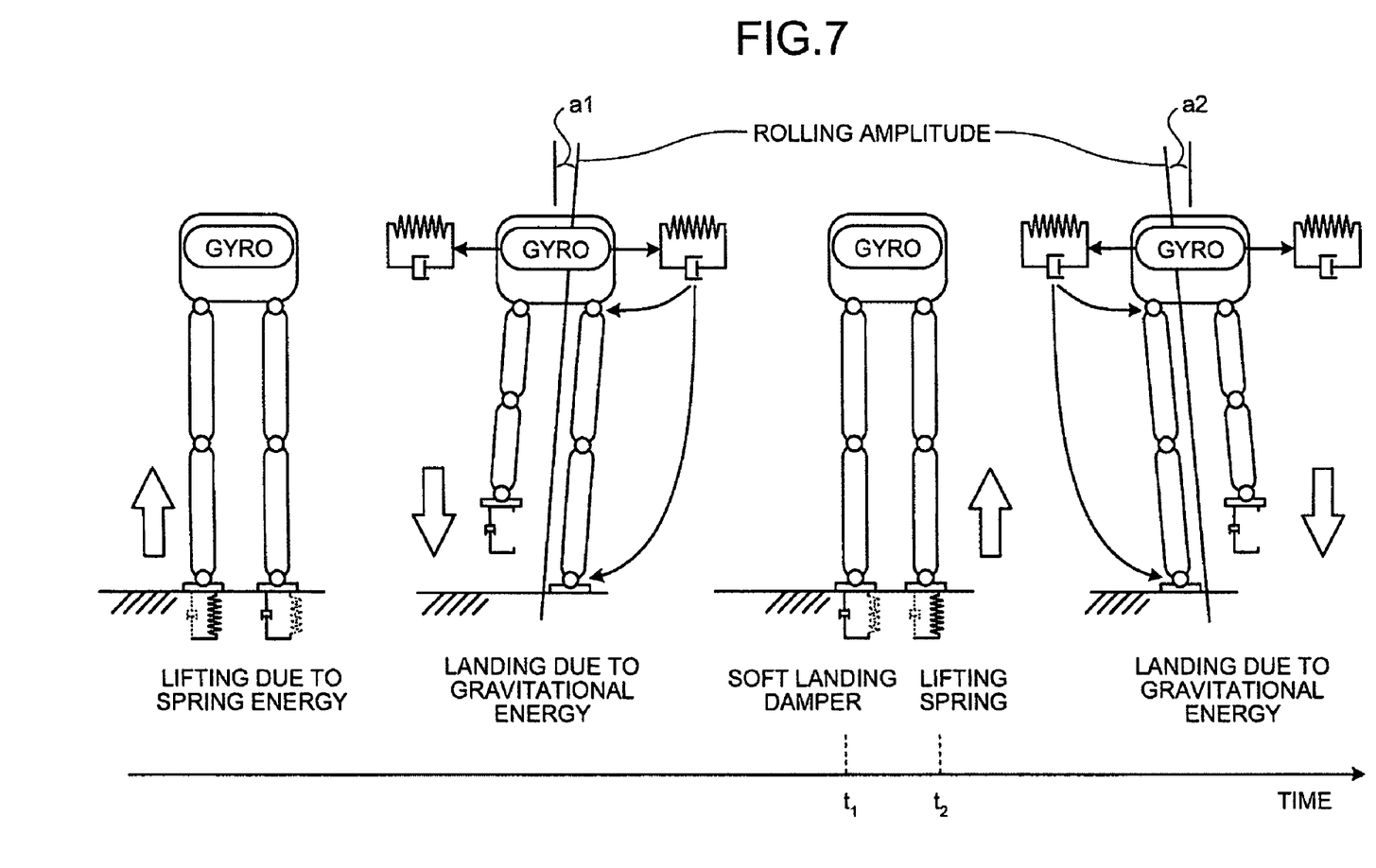
FIG. 7 is an explanatory diagram for explaining rolling amplitudes adjusted by a rolling amplitude adjusting unit.

FIG. 7 is an explanatory diagram for explaining the rolling amplitudes adjusted by the rolling amplitude adjusting unit 123d. In the rolling motion as illustrated in FIG. 7, at the time of shifting from the lifting motion to the landing motion; the rolling to left and right becomes the maximum, that is, the rolling amplitudes are a1 and a2. The rolling amplitude adjusting unit 123d adjusts the rolling amplitudes a1 and a2 so that the gyro feedback control at those points of time when the rolling to left and right becomes the maximum is reduced as much as possible.

Figure 8A:
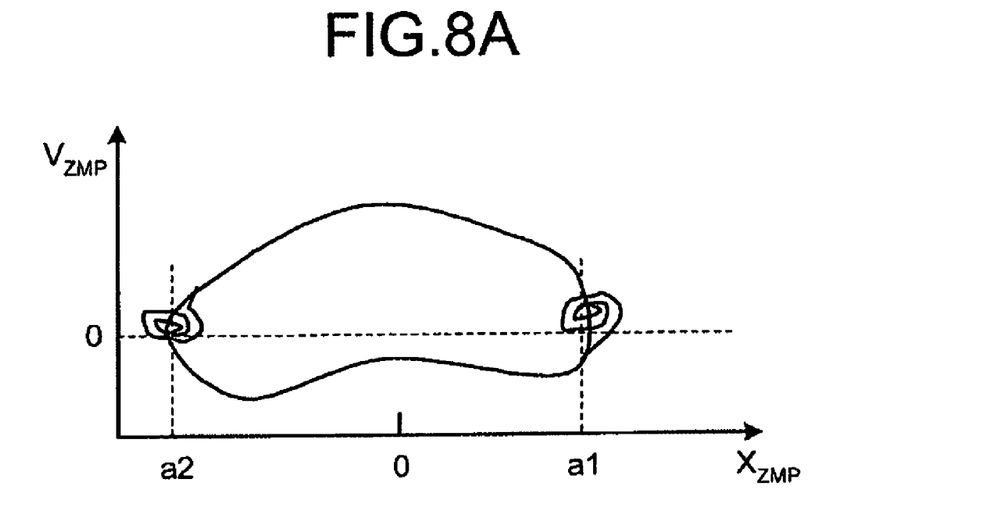
FIGS. 8A and 8B are explanatory diagrams for explaining a rolling amplitude adjustment method performed by the rolling amplitude adjusting unit.
Figure 8B:
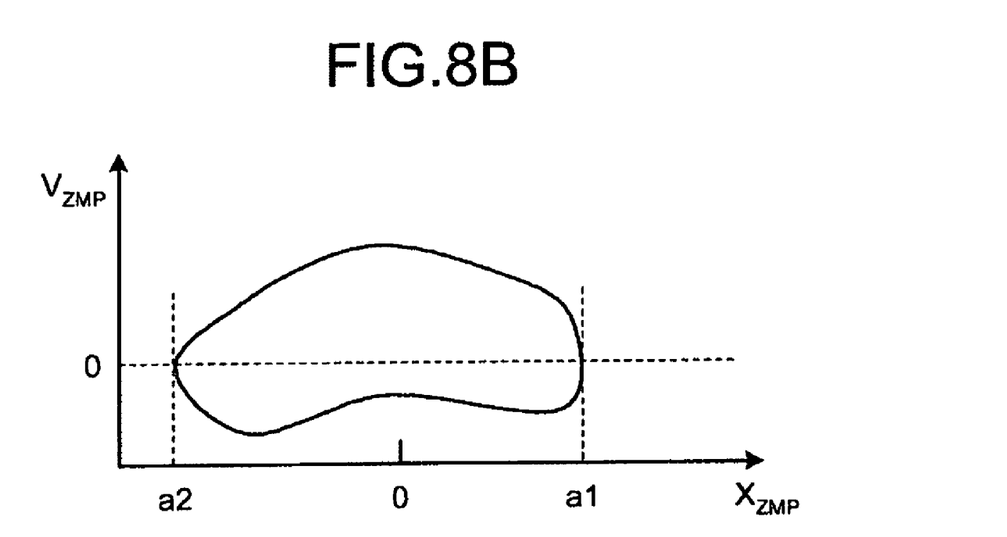

FIGS. 8A and 8B are explanatory diagrams for explaining a rolling amplitude adjustment method performed by the rolling amplitude adjusting unit 123d. FIGS. 8A and 8B illustrate a relation between a sideways moving amount $X_{ZMP}$ and a sideways moving velocity $V_{ZMP}$ of the ZMP. FIG. 8A represents a case when the rolling amplitudes are not adjusted and FIG. 8B represents a case when the rolling amplitudes are adjusted to optimum values.

When the rolling amplitudes are not adjusted as illustrated in FIG. 8A, fluctuation or overshoot occurs in $X_{ZMP}$ due to the gyro feedback control performed at the point of time of $X_{ZMP}$=a1 or $X_{ZMP}$=a2. In comparison, as illustrated in FIG. 8B; because of the optimum adjustment of the rolling amplitudes, the need to perform gyro feedback control at the point of time of $X_{ZMP}$=a1 or $X_{ZMP}$=a2 is eliminated.

More particularly, the rolling amplitude adjusting unit 123d calculates the value of a cost function J that represents the amount of gyro feedback control for the rolling motion of each single cycle and then adjusts the rolling amplitudes so that the value of the cost function J becomes the minimum. The cost function J is defined as follows:

$$J = \int_{t_1}^{t_2} (X_{ZMP} - X_{av}) dt \quad (1)$$

Figure 9:
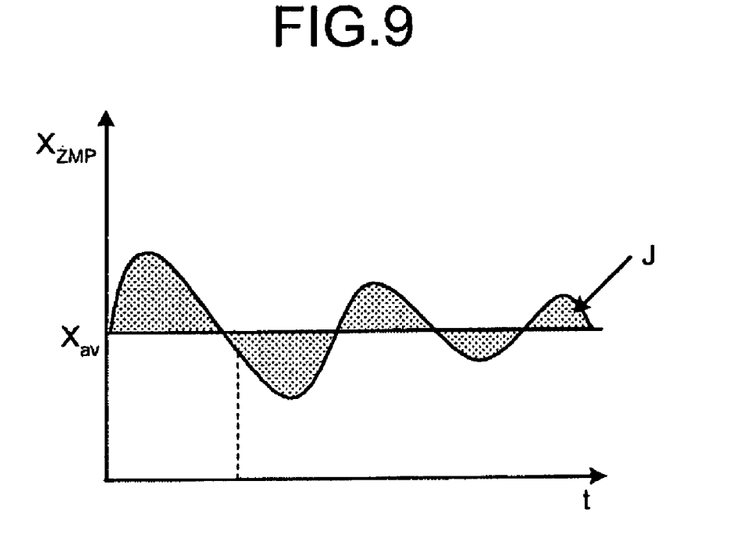
FIG. 9 is a graph for explaining a cost function J.
Figure 10:
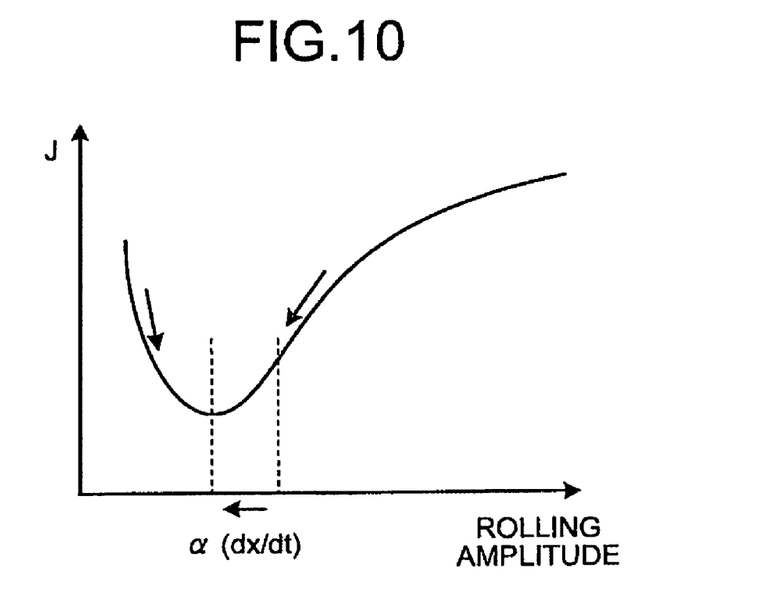
FIG. 10 is a graph for explaining the minimization of the cost function J performed by the rolling amplitude adjusting unit.

Herein, $X_{av}$ represents the average value of $X_{ZMP}$, $t_1$ represents the point of time at which the maximum rolling occurs, and $t_2$ represents the point of time at which the rolling starts to decrease. Moreover, $t_1$ and $t_2$ can be determined according to the cycle of the rolling motion. FIG. 9 is a graph for explaining the cost function J and FIG. 10 is a graph for explaining the minimization of the cost function J performed by the rolling amplitude adjusting unit 123d. In FIG. 10, α represents an adjustment amount calculated for each cycle by the rolling amplitude adjusting unit 123d. The adjustment amount α is defined as below.

$$\alpha = \frac{V(roll_{max})}{V_{max}} \beta \quad (2)$$

Herein, $V_{max}$ represents the maximum value of the sideways moving velocity of the ZMP, $V(roll_{max})$ represents the sideways moving velocity of the ZMP at that point of time at which the maximum rolling occurs, and β represents an experimentally obtained constant number having the default value of 1.

In this way, the rolling amplitude adjusting unit 123d calculates the cost function J and the adjustment amount α for the rolling motion of each single cycle, and then adjusts the rolling amplitudes so that the value of the cost function J becomes the minimum. That enables achieving reduction in the gyro feedback control at the points of time when the rolling to left and right becomes the maximum.

The correcting unit 123e is a processing unit that corrects, by using the output of the compliance control unit 123b and the feedback control unit 123c, the start time of rotation, the angular velocity, the rotation angle, and the like calculated with respect to each of the joints $113_1$ to $113_n$ by the motion generating unit 123a, and outputs commands for the motor of each of the joints $113_1$ to $113_n$.

Figure 11:
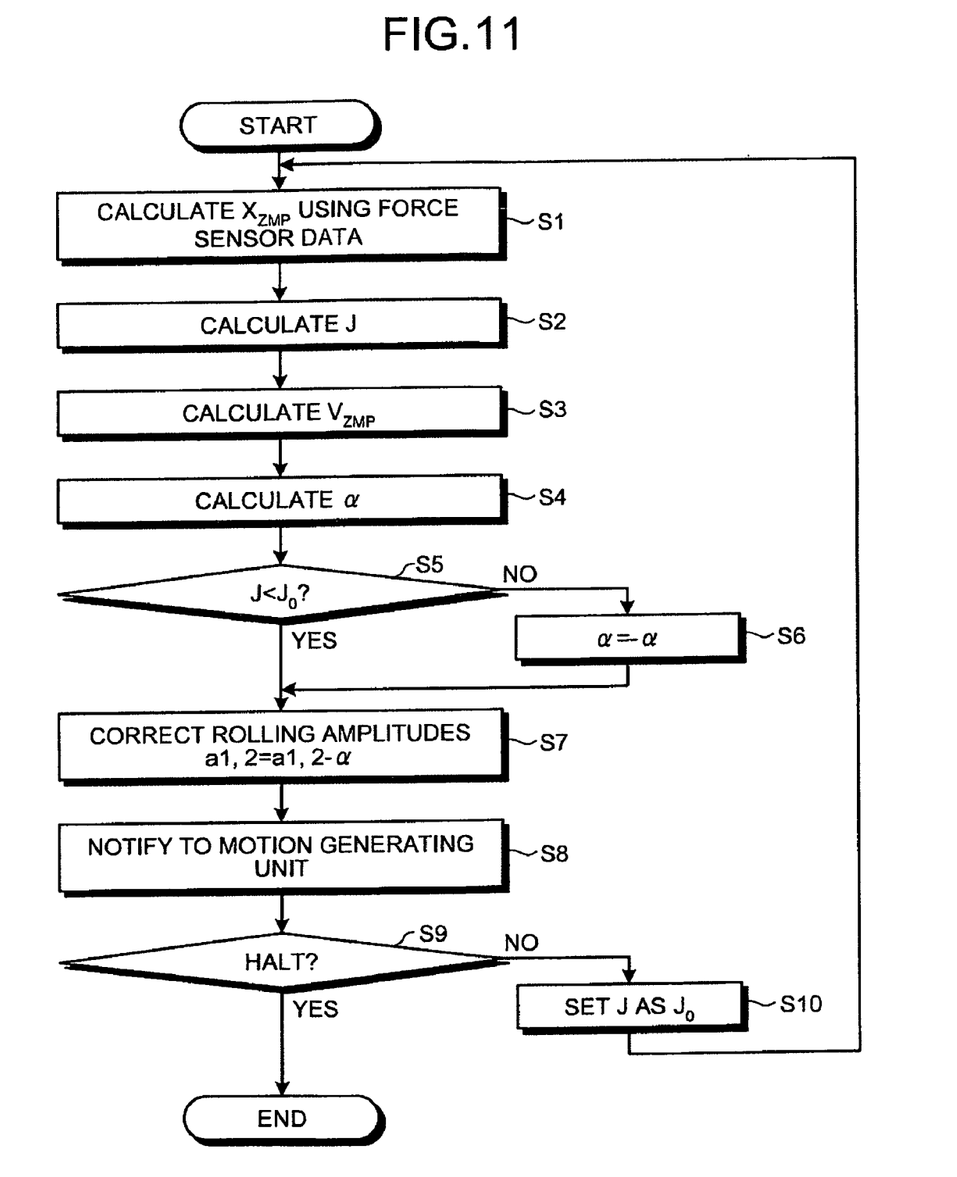
FIG. 11 is a flowchart for explaining a sequence of operations of a rolling amplitude adjustment process performed by the rolling amplitude adjusting unit.

Given below is a sequence of operations of a rolling amplitude adjustment process performed by the rolling amplitude adjusting unit 123d. FIG. 11 is a flowchart for explaining a sequence of operations of the rolling amplitude adjustment process performed by the rolling amplitude adjusting unit 123d. As illustrated in FIG. 11, in the rolling amplitude adjustment process, the rolling amplitude adjusting unit 123d calculates the sideways moving amount $X_{ZMP}$ using the force sensor data (Step S1) and calculates the value of the cost function J (Step S2). Then, the rolling amplitude adjusting unit 123d calculates the sideways moving velocity $V_{ZMP}$ (Step S3) and calculates the adjustment amount a (Step S4).

Subsequently, the rolling amplitude adjusting unit 123d determines whether the calculated value of the cost function J is smaller than a value $J_0$ of the cost function that was calculated for the cycle of the previous rolling motion (Step S5). If the value of the cost function J is not smaller than the value $J_0$, then the rolling amplitude adjusting unit 123d inverts the sign of α (Step S6). Meanwhile, the initial value of $J_0$ is the value of the cost function J calculated for the first cycle.

Then, the rolling amplitude adjusting unit 123d corrects the rolling amplitudes a1 and a2 by subtracting therefrom the adjustment amount α (Step S7) and notifies the corrected rolling amplitudes a1 and a2 to the motion generating unit 123a (Step S8). Upon receiving the corrected rolling amplitudes a1 and a2, the motion generating unit 123a reflects the corrected rolling amplitudes a1 and a2 in the control information generated for the subsequent cycle.

Subsequently, the rolling amplitude adjusting unit 123d determines whether the robot has come to a halt (Step S9). If the robot has not come to a halt, then the rolling amplitude adjusting unit 123d sets the value of the cost function J calculated for the current cycle as the value $J_0$ (Step S10) and returns to Step S1 to perform the rolling amplitude adjustment for the subsequent cycle. On the other hand, if the robot has come to a halt, then the process is terminated.

In this way, since the rolling amplitude adjusting unit 123d performs the rolling amplitude adjustment for each cycle of rolling motion, it becomes possible to reduce the gyro feedback control.

As described above, in the present embodiment, the motion generating unit 123a generates the control information with respect to a walking motion having no movement in the front-back direction; the compliance control unit 123b performs the compliance control based on the force sensor data; and the feedback control unit 123c performs the ZMP feedback control based on the force sensor data and performs the gyro feedback control, based on the gyro sensor data, at the points of time when the rolling to left and right becomes the maximum. Then, the rolling amplitude adjusting unit 123d calculates the value of the cost function J and the adjustment amount α for each cycle of rolling motion, and adjusts the rolling amplitudes so that the value of the cost function J becomes smaller. The motion generating unit 123a reflects the changes of the rolling amplitudes in the control information for the subsequent motion cycle. Such a configuration enables achieving reduction in the gyro feedback control and achieving improvement in the robot walking while reducing the motor exhaustion.

According to an embodiment, motors are switched less often in a gyro feedback control.

According to an embodiment, rolling amplitudes can be corrected without difficulty.

According to an embodiment, the rolling amplitudes can be corrected in an appropriate manner.

According to an embodiment, the rolling amplitudes can be corrected based on an accurate value of the gyro feedback control amount.

According to an embodiment, the gyro feedback control can be reduced for each cycle.

According to an embodiment, the need to perform control for the movement in the front-back direction is eliminated.

According to an embodiment, reducing the gyro feedback control enables achieving improvement in the robot walking. Moreover, by reducing the number of switching operations of motors in the gyro feedback control, it becomes possible to reduce the motor exhaustion.

According to an embodiment, rolling amplitudes can be corrected without difficulty. Because of that, the rolling amplitudes can be corrected while the robot is walking.

According to an embodiment, appropriate correction of the rolling amplitudes enables achieving reduction in the gyro feedback control in an appropriate manner.

According to an embodiment, since the rolling amplitudes are corrected according to an accurate value of the gyro feedback control amount, it becomes possible to accurately correct the rolling amplitudes.

According to an embodiment, reduction in the gyro feedback control for each cycle enables achieving efficient reduction in the gyro feedback control.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A robot control apparatus for controlling walking of a robot, the robot control apparatus comprising:
    a control information generating unit that generates control information based on a posture of a robot at a plurality of different points of time including at least a reference posture when the robot is independently standing without falling down;
    a feedback control unit that, with respect to the robot controlled according to the control information generated by the control information generating unit, performs a gyro feedback control based on a rotation angle measured at two points of time when rolling to left and right becomes maximum by a gyro sensor installed in the robot; and
    a rolling amplitude correcting unit that, while the robot is in motion, corrects a rolling amplitude that is used by the control information generating unit in generating the control information so that a value of a cost function that is calculated for a rolling motion of each single cycle and represents the amount of gyro feedback control performed by the feedback control unit is reduced.

2. The robot control apparatus according to claim 1, wherein the rolling amplitude correcting unit includes
    a zero moment point (ZMP) calculating unit that calculates a sideways moving amount and a sideways moving velocity of a ZMP based on force sensor data measured by a force sensor installed at a sole of the robot; and a correction amount calculating unit that calculates a correction amount based on the sideways moving velocity calculated by the ZMP calculating unit and corrects the rolling amplitude.

3. The robot control apparatus according to claim 2, wherein the correction amount calculating unit calculates the correction amount based on a ratio of a maximum value of the sideways moving velocity and a sideways moving velocity at a point of time of maximum rolling.

4. The robot control apparatus according to claim 1, wherein the rolling amplitude correcting unit performs correction to reduce the value of the cost function based on an amount of sideways movement of the zero moment point (ZMP) during a period from a point of time of maximum rolling to when the rolling decreases.

5. The robot control apparatus according to claim 1, wherein the rolling amplitude correcting unit corrects the rolling amplitude for each cycle in which the robot repeats a walking motion.

6. The robot control apparatus according to claim 1, wherein the robot performs strideless walking.

7. A robot control method for controlling walking of a robot, the robot control method comprising:

generating control information based on a posture of a robot at a plurality of different points of time including at least a reference posture when the robot is independently standing without falling down;

performing, with respect to the robot controlled according to the control information generated in the generating, a gyro feedback control based on a rotation angle measured at two points of time when rolling to left and right becomes maximum by a gyro sensor installed in the robot; and correcting, while the robot is in motion, a rolling amplitude that is used in the generating of the control information so that a value of a cost function that is calculated for a rolling motion of each single cycle and represents the amount of gyro feedback control in the performing is reduced.

* * * * *